Aug. 8, 1961 H. D. CRANE 2,995,663

MAGNETIC CORE BINARY COUNTER CIRCUIT

Filed June 12, 1958 3 Sheets-Sheet 1

INVENTOR.
HEWITT D. CRANE

BY Christie, Parker & Hale
ATTORNEYS

Aug. 8, 1961 H. D. CRANE 2,995,663

MAGNETIC CORE BINARY COUNTER CIRCUIT

Filed June 12, 1958 3 Sheets-Sheet 2

INVENTOR.
HEWITT D. CRANE

BY Christie, Parker & Hale

ATTORNEYS

MAGNETIC CORE BINARY COUNTER CIRCUIT

Filed June 12, 1958 3 Sheets-Sheet 3

INVENTOR.
HEWITT D. CRANE
BY
Christie, Parker & Hale
ATTORNEYS 2,995,663
Patented Aug. 8, 1961

2,995,663

MAGNETIC CORE BINARY COUNTER CIRCUIT

Hewitt D. Crane, Palo Alto, Calif., assignor to Burroughs Corporation, Detroit, Mich., a corporation of Michigan Filed June 12, 1958, Ser. No. 741,695
18 Claims. (Cl. 307—88)

This invention relates to ferrite magnetic core circuits, and more particularly is concerned with a magnetic core circuit having the function of a binary counter.

The use of ferrite cores in memory circuits and binary logic circuits is well known. Ferrite is a magnetic material characterized by a high degree of magnetic flux remanence, such that the remanent flux is almost as great as the saturated flux. Due to this property a core can be substantially saturated with flux in one direction or the other, with the direction of flux being indicative of whether a binary zero or a binary one is stored in the core. Various circuit arrangements have been devised for utilizing this property of ferrite cores in developing memory circuits and logic circuits.

In copending application Serial No. 698,633, filed November 25, 1957, and now abandoned, in the name of Hewitt D. Crane and assigned to the assignee of the present invention, there is described a ferrite core register having a novel transfer circuit requiring no diodes or other impedance elements in the transfer loops between cores. The basic binary storage element of this circuit is an annular ferrite core having a small input aperture and output aperture. The binary zero digit is stored in the form of flux oriented in the same direction in the core on either side of the respective apertures, while the binary one digit is stored in the form of flux extending in opposite directions on either side of the respective apertures. Transfer is effected by applying a current pulse of predetermined magnitude to a coupling loop linking one aperture in each of the two cores, one core constituting a transmitting core and the other core constituting a receiving core. Each core acts as a binary storage device and the binary information stored may be shifted from core to core as required.

The principles of this invention of storing information in the form of flux oriented in a particular direction around input and output apertures and transferring information from core element to core element by a current pulse of predetermined magnitude has been incorporated in the design of a number of different logic circuits. For example, a core device has been provided for performing a negating function, an "and" function, an "exclusive or" function, and the like. These functions may be performed by proper design of the core elements themselves, the logic being performed by the configuration of the magnetic circuits provided by the core elements.

By the present invention, a binary counter circuit is provided which operates on the principles as briefly set forth above. Thus the binary counter utilizes magnetic core logic circuits with transfer loops between core elements that are pulsed by current pulses of predetermined magnitude. The logic circuits are linked together in a manner to perform the binary counting function wherein two binary one digits must be read into the counter to generate a binary one at the carry output of the counter. Binary counters can be coupled together in a chain to form a binary divider chain.

In brief, the invention involves a "trigger" circuit which can be alternately set in two stable states by successive inputs. The trigger circuit consists of a straight transfer core circuit and an "exclusive or" core circuit connected in a closed loop so that the output of one core element is fed to the input of the other core element and vice versa. The trigger input is applied to the second input of the "exclusive or" core circuit. To provide a counter, an and core circuit is added which compares the input with the stable condition of the flip-flop. The "and" circuit produces an output on alternate inputs, corresponding to the flip-flop in one of its two stable conditions. The output from the "and" circuit may be used as a carry signal coupled to the input of a successive counter stage to form a divider chain.

For a more complete understanding of the invention, reference should be had to the accompanying drawings, wherein.

Figures 1, 2, 3, 4, 5, 6, 7:
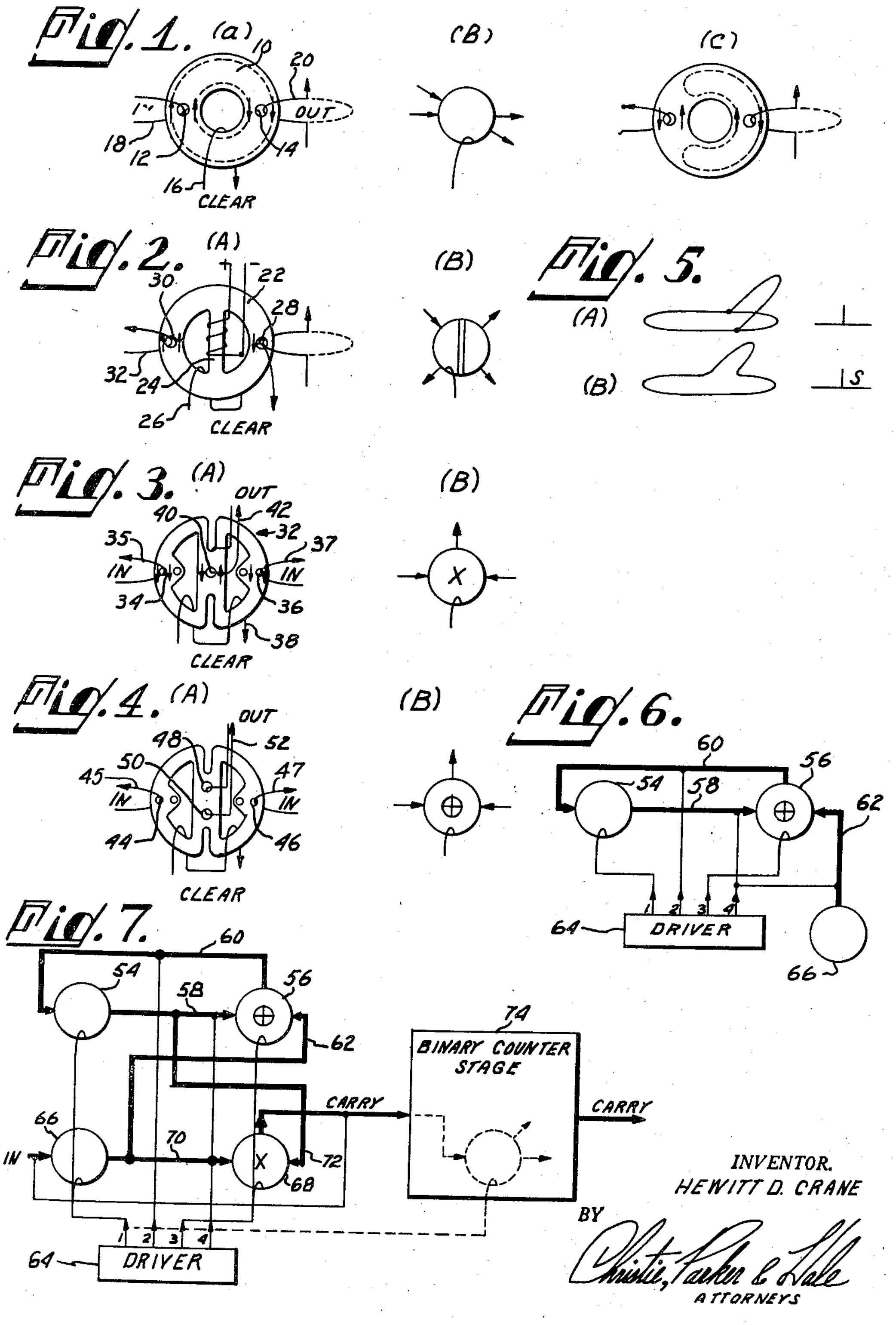
FIG. 1 shows a delay core element used heretofore in providing storage and straight transfer of binary information, the core element being shown in the two binary flux conditions together with a schematic representation of the delay circuit.
FIG. 2 shows a negating core element used heretofore in providing a negating type transfer of binary information together with a schematic representation of the negating magnetic core circuit.
FIG. 3 shows a core element used heretofore in providing a logical "and" function together with a more schematic representation of the "and" circuit.
FIG. 4 shows a core element used heretofore in providing an "exclusive or" function, together with a more schematic representation of the "exclusive or" circuit.
FIG. 5 shows a pair of transfer loops, each including three windings, the one transfer loop showing the windings connected in parallel and the other connected in series, together with a schematic representation for these two types of connections.
FIG. 6 is a schematic circuit diagram showing the operation of a magnetic core trigger circuit.
FIG. 7 is a schematic showing of one embodiment of the invention providing a two-stage binary counter circuit.

Consider an annular core, such as indicated at 10 in FIG. 1, made of magnetic material, such as ferrite, having a square hysteresis loop characteristic, i.e., a material having a high flux retentivity or remanence. The annular core is preferably provided with two small apertures 12 and 14, each of which divides the annular core into two parallel flux paths as indicated by the arrows of FIG. 1A. If a large current is pulsed through the central opening of the core 10, as by a clearing winding 16, the flux in the core may be saturated in a clockwise direction. The core is then said to be in a cleared or binary zero condition.

If a current is passed through either of the apertures 12 or 14, as by either of the windings 18 or 20, in the direction indicated in FIG. 1C, and the current is of sufficient magnitude to cause switching of flux around the central opening of the annular core, a portion of the flux can be reversed so that the flux extends in opposite directions on either side of the respective apertures 12 and 14, as indicated by the arrows in FIG. 1C. The core is then said to be in the set or binary one state.

The significant aspect of the transfer circuit using the core elements of FIG. 1, as described in detail in copending application Serial No. 698,633 mentioned above, is that with a given number of turns linking one of the small apertures in the core and with the core in its cleared state as shown in FIG. 1A, a current exceeding a threshold $I_t$ must be provided to change the core to its set state as shown in FIG. 1C. If the current does not exceed this threshold level, substantially no flux is switched around the core. The aperture is said to be "blocked" when the current passing through the aperture must exceed the threshold value $I_t$ in order to switch any flux in the core element.

On the other hand, if the core is already in its set state, a very small current, substantially less than the threshold value $I_t$, causes flux to switch locally about the aperture. In this case the aperture is said to be "unblocked." Thus if a current slightly less than the threshold current $I_t$ is passed through an aperture in a core element, flux will be switched or not switched within the core depending upon whether the core is in its cleared state, i.e., depending upon whether the aperture is blocked or unblocked.

The core elements of the type shown in FIG. 1 provide straight transfer, i.e., a binary one flux condition produces a binary one flux condition at the output. The core elements are used for storage or delay. The core elements may be represented schematically as indicated in FIG. 1B, to simplify the diagramming of complex circuits employing delay core elements.

To provide a negation function, a core element in which the input aperture is blocked and the output aperture is unblocked, corresponding to the flux condition of the input aperture in FIG. 1A and the flux condition of the output aperture of FIG. 1C must be established in the cleared condition. This is accomplished by the negating core element and associated circuit of FIG. 2. The negating core element 22 is provided with a central leg 24 having a hold winding thereon for maintaining the flux in one direction in the central leg 24. A clear winding 26 not only links the core but links the output aperture 28. Thus when the negating core element 22 is cleared, the input aperture 30 is cleared and the output aperture 28 is unblocked. Only if a current exceeding the threshold level $I_t$ is applied to an input winding 32 linking the input aperture 30 can flux be switched at the output aperture 28. As a result the output aperture becomes blocked. Thus it will be seen that the negating core element of FIG. 2 provides the opposite output condition from the straight transfer core element of FIG. 1. The schematic representation for use in diagramming circuits employing negating core elements may be as shown in FIG. 2B.

FIG. 3 shows a logical "and" circuit such as described in more detail in copending application Serial No. 741,693, filed June 12, 1958, in the name of Hewitt D. Crane. The "and" core element, indicated generally at 32, includes two separate sections defining relatively long magnetic flux paths and having input apertures 34 and 36 respectively linked by input windings 35 and 37. Both sections are cleared with the flux in the clockwise direction by a clear winding 38. An output aperture 40 is located in a common region between the two sections of the core element 32 and an output winding 42 linking the output aperture 40 is used for sensing the condition of flux around the output aperture 40. Only when the flux at the two input apertures is set to the binary one condition, by pulsing a current above the threshold level $I_t$ through the two input windings, can flux be switched locally around the output aperture 40 in response to an advance current in the output winding 42. The logical "and" circuit is shown schematically in FIG. 3B.

In FIG. 4 is shown a core circuit for performing an "exclusive or" function, such as described in more detail in the above-mentioned copending application Serial No. 741,693. The logical "or" circuit is similar to the logical "and" circuit of FIG. 3 in that the core element includes two sections in which are located input apertures 44 and 46 linked by input windings 45 and 47. However, the common region between the two sections of the core has two output apertures 48 and 50 linked by an output winding 52. If either one of the input apertures is set to the binary one flux condition, flux can be switched locally about one of the output apertures by an advance current passed through the output winding 52. However, if both the input apertures are in the binary zero flux condition or in the binary one flux condition, both output apertures 48 and 50 are blocked. FIG. 4B is a schematic representation of "exclusive or" circuit.

Where a transfer loop includes windings linking more than two core elements, the windings may be either connected in parallel or in series as shown in FIGS. 5A and B respectively. A schematic representation for series and parallel type of connections may be as indicated to the right in FIG. 5.

Keeping in mind the operation of the various core devices described above and the schematic representation for these core devices, reference may be had to FIG. 6 wherein a trigger circuit according to the present invention is shown schematically. The trigger circuit includes a straight transfer or delay device 54 and an "exclusive or" core device 56. The transfer loop 58 couples the output of the straight transfer device 54 to the input of the "exclusive or" device 56, while a transfer loop 60 couples the output of the "exclusive or" device 56 back to the input of the straight transfer device 54. An input is applied by a transfer loop 62 to the other input of the "exclusive or" device 56 from an input core device, such as the delay core device 66.

Pulsing of the respective transfer loops and the clearing windings is controlled from a suitable driver circuit indicated generally at 64 which cyclically pulses four outputs. The first output is coupled to the clearing winding of the straight transfer device 54, the second output is applied to the transfer loop 60, the third output is applied to the clearing winding of the "exclusive or" device 56, and the fourth output is applied to the transfer loops 58 and 62. It should be noted, in conformance with the teaching of the above-mentioned copending application Serial No. 698,633, the driver is designed to provide current pulses well above the threshold level to the clearing windings. However, the current pulses applied to the transfer loops are held at a constant level slightly below the threshold required to switch flux in a transmitting core element when the output aperture linked by a particular transfer loop is in the binary zero flux condition.

In operation, it will be seen that if the external input at 62 is a binary zero, either a binary zero or a binary one state can be stably circulated around the closed loop including the transfer loops 58 and 60. In other words if the external input is zero and the loop 58 transfers a binary zero to the "exclusive or" device 56, the output transferred by the loop 60 will be a binary zero. If the input to the straight transfer device 54 is a zero, the input to the "exclusive or" device 56 will continue to be zero through successive cycles of the driver circuit 64. Likewise if the transfer loop 58 establishes a binary one at the input of the "exclusive or" device 56, a binary one condition will be transferred out by the loop 60 to the input of the straight transfer device 54. Accordingly, a binary one condition may be continuously circulated by successive cycles of operation of the driver circuit 64.

However, if a binary one is transferred into the "exclusive or" device from the external input by means of the loop 62, the stored state being circulated between the straight core device 54 and the "exclusive or" device 56 is altered. If a binary one was being circulated it will be altered to a binary zero, and if a binary zero was being circulated it will be changed to a binary one. This is apparent, since if a binary one is applied to one input of the "exclusive or" device 56, the output will always be in the opposite state from the internal input applied by the transfer loop 58. Thus the "exclusive or" device 56, with a binary one applied to the external input 62, automatically changes the output to the opposite condition from the condition of the internal input 58. Therefore the circuit of FIG. 6 has the attributes of a conventional trigger circuit in that it is triggered alternately from one stably circulated state to the other stably circulated state every time a binary one condition is applied to the external input 62.

To make a counter out of the circuit of FIG. 6, it is only necessary to propagate a change signal when the internally circulated state of the trigger circuit goes from the binary one state to the binary zero state for counting up; or from the binary zero state to the binary one state for counting down. Thus in the circuit of FIG. 7 there is added to a trigger circuit, such as described above in connection with FIG. 6, a logical "and" core device 68. The straight transfer core device 66 to which the external input signal is applied has two outputs, one of which is coupled to the "exclusive or" device 56 through the coupling loop 62, the other of which is coupled to one input of the logical "and" device through a coupling loop 70. The straight transfer device 54 is coupled to the other input of the logical "and" core device 68 by a coupling loop 72.

In operation, the driver 64 clears the straight transfer core devices 54 and 66 simultaneously. The next pulse transfers in the input signal to the straight transfer device 66. The next pulse simultaneously clears the "exclusive or" core device 56 and the logical "and" core device 68. The next pulse from the driver 64 transfers information from the outputs of the two straight transfer devices 54 and 66 to both the "exclusive or" device 56 and the logical "and" core device 68.

If a binary zero is applied to the input, it will be seen that it has no effect on the operation of the circuit. Either a binary zero or a binary one may be circulated between the core devices 54 and 56 of the trigger circuit as described above in connection with FIG. 6. However, if a binary one is read into the core device 66, when it is transferred to the "exclusive or" device 56 and the logical "and" device 68 it will change the stably circulated state of the trigger circuit and will produce an output from the logical "and" circuit 68 only if the trigger circuit has been circulating a binary one, i.e., only if a binary one is simultaneously transferred by the loop 72 from the straight transfer device 54 to the input of the logical "and" core device 68. Since only alternate binary ones applied to the input establish a binary one in the circulating loop of the trigger circuit, a binary one carry signal will be produced at the output of the logical "and" circuit 68 only in response to every other binary one applied to the input.

To make a divider circuit, several counter stages as described above may be connected in a chain. FIG. 7 indicates a second stage 74 to which the output of the previous stage is coupled. A transfer pulse is derived from the second output of the driver 64 so that transformation into a stage occurs simultaneously with transfer of information out of a stage. All stages may be driven from the same four outputs of the driver 64.

Figure 8:
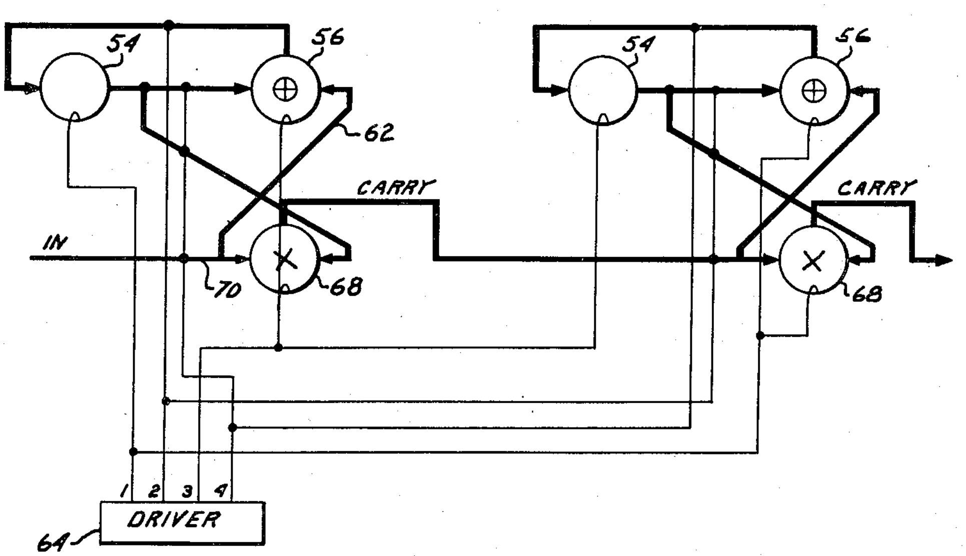
FIG. 8 shows a modification of the counter circuit of FIG. 7.

The input straight transfer core device 66 is not essential to the operation of the counter circuit of FIG. 7. As shown in FIG. 8, the straight transfer core device 66 may be eliminated. The input is coupled simultaneously to the "exclusive or" device 56 and the logical "and" device 68 by a series connection of the respective windings in the transfer loop, as indicated in FIG. 8. This has the effect that the input to a given stage occurs in response to a different output pulse from the driver 64 than produces transfer from the output. In this way the carry propagation rate of the divider chain is two counter stages for a complete cycle of four pulses from the driver circuit 64. Alternation of the connections to the respective outputs of the driver circuit 64 to successive stages is required in the manner shown in FIG. 8.

To provide a countdown operation of the divider chain, it is only necessary to arrange the logical "and" circuit 68 to produce a binary one output when a binary zero is applied to the input from the straight transfer device 54 of the trigger circuit. This can be done by simple modification of the logical "and" circuit 68 according to the teaching of the above-mentioned copending application Serial No. 741,693.

Figure 9:
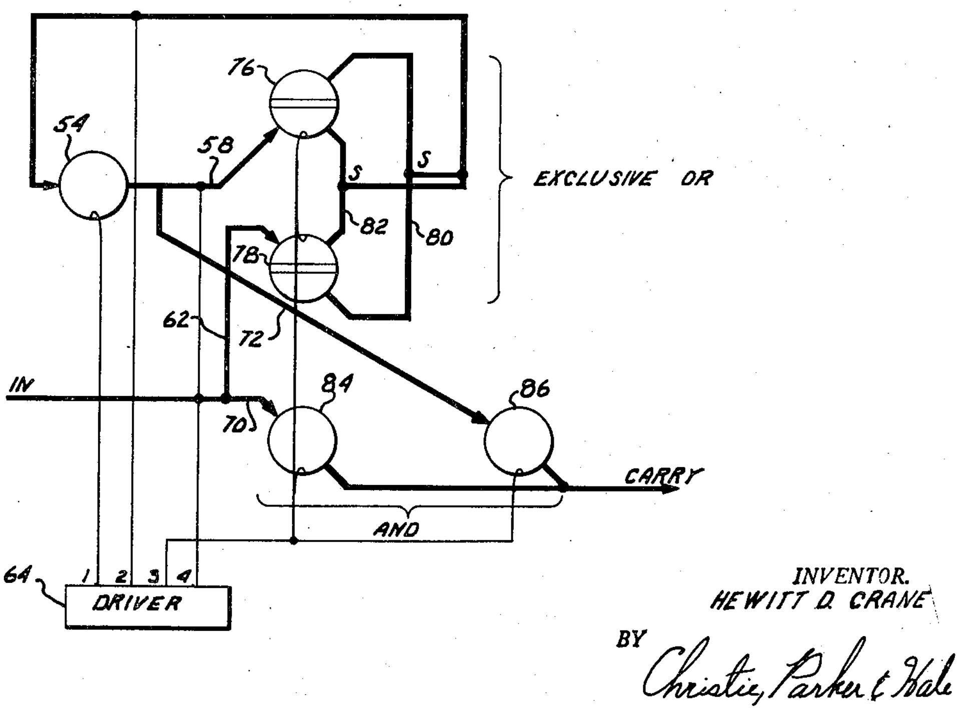
FIG. 9 is a schematic circuit diagram of a modified single binary counter stage.

Basic core circuits in each stage of the above-described counters can be altered in form as long as they perform the same function. Thus the "exclusive or" circuit 56 may take the form of a circuit described in copending application Serial No. 741,692, filed June 12, 1958, now Patent No. 2,927,220, in the name of Hewitt D. Crane. Also the logical "and" circuit 68 may take the form described in copending application Serial No. 741,148, filed January 20, 1958, and now abandoned, in the name of Hewitt D. Crane. FIG. 9 shows a single binary counter stage modified to incorporate the "exclusive or" circuit and logical "and" circuit described in the above-mentioned copending applications. Thus the "exclusive or" circuit includes a pair of negating core elements 76 and 78. The two negating outputs are connected in series by a loop 80 while the non-negating outputs are coupled by a loop 82. Two series-connected loops in turn are joined in a parallel connection and coupled to the input of the straight transfer core device 54.

The logical "and" circuit consists of two straight transfer core devices 84 and 86. The input transfer loop 70 is coupled to the core circuit 84 while the transfer loop 72 is coupled to the core device 86 of the logical "and" circuit. The output windings of the respective core devices 84 and 86 are joined in a parallel connection to form the output. As in the circuit of FIG. 8, the "exclusive or" circuit and the logical "and" circuit are cleared by the third output pulse from the driver 64, the clearing windings of the respective core devices comprising these two circuits being connected together as shown. The operation of the circuit of FIG. 9 is otherwise identical to the operation of the circuit of FIG. 8.

Figure 10:
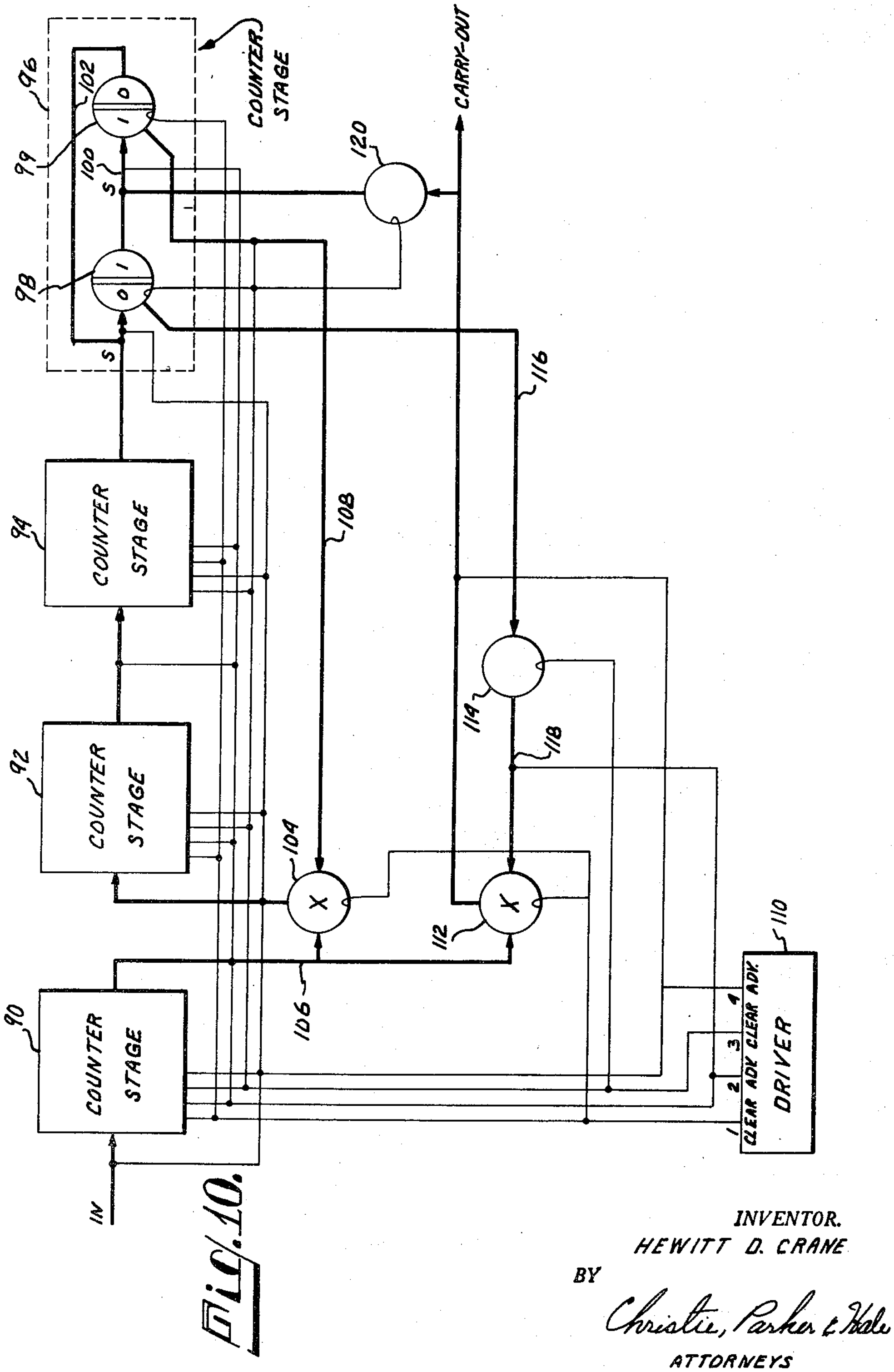
FIG. 10 shows a decimal counter circuit.

The counter stages as above-described can be used to provide a decimal counter of the feedback type, as shown in FIG. 10. The decimal counter includes four binary counter stages as indicated at 90, 92, 94, and 96 respectively. The counter stages 90, 92, and 94 may be identical to the circuits described above in connection with FIGS. 8 or 9. The fourth binary counter stage, as indicated at 96, may be a simple flip-flop such as described in copending application Serial No. 741,694, filed June 12, 1958, in the name of Hewitt D. Crane and assigned to the assignee of the present invention. The flip-flop consists of two negating core elements 98 and 99 connected in a closed loop by a pair of transfer loops 100 and 102. The carry output of the third binary counter stage 94 is series-connected with the transfer loop 102 so that either the carry output of the binary counter stage 94 or the output of the negating circuit 100 may transfer a binary one to the input of the negating core element 98.

The first binary counter stage is coupled to the second binary counter stage through a logical "and" circuit 104. One input of the logical "and" circuit 104 is connected to the carry output of the first binary counter stage by a transfer loop 106 while the other input to the logical "and" circuit 104 is coupled to a non-negating output of the negating core element 99 by means of a transfer loop 108.

All the clear windings of the core elements in the circuit of FIG. 10 as well as all the transfer loops are controlled from a driver circuit 110 identical to the driver circuit 64 described above. The driver circuit 110 is arranged to cyclically produce four successive pulses on as many outputs. These four outputs are connected to the counter stages 90 and 92 in the same fashion as the driver circuit 64 of FIG. 8 is connected to the first binary counter stage of FIG. 8. The driver circuit 110 is connected to the third binary counter stage 94 in the same manner the driver 64 is connected to the second stage in the circuit of FIG. 8, i.e., with the advance pulses coupled to the transfer loop being interchanged.

In the flip-flop of the last counter stage 96, the negating core element 99 is cleared by the first pulse of a sequential series from the driver 110, while the negating circuit 98 is cleared by the third pulse of a sequential series from the driver circuit 110. The transfer loops 100 and 102 are respectively energized by the second and fourth pulses from the driver circuit 110.

The transfer loop 108 coupling the non-negating output of the negating core element 99 to the logical "and" circuit 104 is preferably pulsed by the third pulse from the driver 110. This pulse is normally used for clearing and not for advancing information. However, by using this pulse for advancing information to the "and" circuit 104 at a normal clear time, the readout from the negating circuit 98 does not interfere with the normal reading in or reading out from that core element. This technique is described in more detail in copending application Serial No. 741,687, filed June 12, 1958, now Patent No. 2,936,445, in the name of David R. Bennion et al., and assigned to the assignee of the present invention.

It will be apparent from the description of the circuit of FIG. 10 thus far that the logical "and" circuit 104 will apply the carry output of the first counter stage 90 to the input of the second counter stage 92 as long as the flip-flop is an initial stable state in which binary ones are transferred by the transfer loop 100. The reason is that as long as the flip-flop is in this stable state, binary ones will be transferred to the input of the logical "and" circuit 104 by the transfer loop 108.

The eighth input pulse to the first counter stage 90 produces a carry pulse from the output of the third counter stage 94. This carry signal changes the flip-flop to its other stable state in which the transfer loop 102 transfers the binary one condition. The result is that no binary ones are transferred by the loop 108 to the logical "and" circuit 104, preventing further transfer of binary ones to the input of the second counter stage 92.

To derive a carry output following the tenth binary one read into the input of the first counter stage 90, a second logical "and" circuit, indicated at 112, is provided, one input winding being connected in series with the transfer loop 106. The other input is coupled to a non-negating output of the negating core circuit 98 through a simple delay core element 114. A transfer loop 116 between the output of the negating core element 98 and the delay element 114 is pulsed by the first pulse of the sequence of four pulses derived from the driver 110, which pulse normally corresponds to a clear time. This avoids reading out of the negating element 98 on the auxiliary transfer loop 116 at a time that information is normally being read into or read out of the negating core element 98. The delay circuit 114 is cleared by the third output pulse from the driver 110. A transfer loop 118, coupling the output of the delay circuit 114 to the input of the logical "and" circuit 112 is pulsed by the second output of the driver 110.

In this manner the first carry pulse derived from the counter stage 90, after the flip-flop stage 96 has been changed to its second stable state by the output of the counter stage 94, produces an output from the logical "and" circuit 112. The binary one thus derived from the logical "and" circuit 112 provides the decimal carry output, since it is produced by every tenth binary one signal read into the input counter stage 90.

The decimal carry output is used to reset the flip-flop of the last counter stage 96 to its initial condition so that the decimal counter is reset after every ten binary one signals read into the decimal counter. To this end, a series connected winding in the output transfer loop from the logical "and" circuit 112 is coupled to a delay circuit 120. The output winding from the delay circuit 120 is connected in series with the transfer loop 100 of the flip-flop circuit 96. The delay core element 120 is cleared by the third output pulse from the driver circuit 110. In this manner the decimal carry output resets the flip-flop 96 so that the transfer loop 100 is again transferring binary ones while the transfer loop 102 is transferring binary zeros.

The function of the delay circuits 114 and 120 is mererly to satisfy the timing requirements of the circuit. For example, the output transfer loop from the logical "and" circuit 112 is not pulsed at the same time as the transfer loop 100 of the flip-flop 96, necessitating a two-pulse delay.

What is claimed is:

1. Apparatus comprising at least one binary counter stage including an "exclusive or" magnetic core circuit having a pair of input windings and an output winding, a delay magnetic core circuit having an input winding and an output winding, the input winding being connected in shunt with the output winding of the "exclusive or" circuit to form a first transfer loop and the output winding being connected in shunt with one of the input windings of the "exclusive or" circuit to form a second transfer loop, a logical "and" magnetic core circuit having a pair of input windings and an output winding, one of the input windings being connected in series with the output winding of the delay circuit, means for alternately pulsing a transfer current through the two windings of the first transfer loop and through the two windings of the second transfer loop, and means for simultaneously pulsing a current through the other input windings of the "exclusive or" circuit and the "and" circuit in synchronism with the pulsing of the second transfer loop, said last-named means providing a periodic input to the counter, the output carry signal being derived from the output winding of the "and" circuit.

2. Apparatus as defined in claim 1 including a plurality of said binary counter stages, and transfer means coupling the output winding of the "and" circuit of each stage to said other input windings of the "exclusive or" circuit and the logical "and" circuit of the next suceeding stage.

3. Apparatus as defined in claim 1 further comprising two additional of said binary counter stages and a magnetic core flip-flop stage, the flip-flop stage including a pair of negating core elements each having an input winding, a negating output winding, and a non-negating output winding, the input winding of one negating core element being connected in shunt with the negating output winding of the other negating core element to form a pair of transfer loops linking the negating core elements, a pair of logical "and" circuits each having a pair of input windings and an output winding, one input winding of one of said pair of "and" circuits being connected in series with one input of the other "and" circuit, the two input windings in series being connected in shunt with the output winding of the "and" circuit of the first counter stage, the output winding of one of said pair of "and" circuits being connected in shunt with the one input of the "exclusive or" circuit of the second counter stage, the third counter stage having an input winding of the "exclusive or" circuit connected in shunt with the output winding of the "and" circuit in the second stage, the output winding of the "and" circuit of the third stage being connected in series with one of the transfer loops of the flip-flop stage, transfer means for coupling the non-negating output winding of one of the negating core elements of the flip-flop stage to an input winding of one of said pair of "and" circuits, transfer means for coupling the non-negating output winding of the other negating core element of the flip-flop stage to an input winding of the other of said pair of "and" circuits, and transfer means for coupling the output winding of the other of said pair of "and" circuits to the input winding of one of the negating core elements for changing the stable state of the flip-flop, a decimal carry signal being derived from the output winding of said other of the pair of "and" circuits.

4. A magnetic core circuit for generating a carry signal at the output in response to every other one of a succession of input signals at the input, the circuit comprising first magnetic core circuit means for producing a binary one flux condition at the output in response to a binary one flux condition being produced exclusively at one or the other of two inputs, whereby the circuit means performs an "exclusive or" function, second magnetic core circuit means for producing a binary one flux condition at the output in response to a binary one flux condition being produced at the input, means responsive to a current pulse for transferring a binary one flux condition from the output of the first means to the input of the second means, means responsive to a current pulse for transferring a binary one flux condition from the output of the second means to one of the inputs of the first means, third magnetic core circuit means for producing a binary one flux condition at the output in response to a binary one flux condition being produced at both of two inputs, whereby the circuit means performs an "and" function, means responsive to a current pulse for transferring a binary one flux condition from the output of the second means to one of the inputs of the third means, means responsive to each of the successive input signals for producing a binary one flux condition at the remaining inputs of the first and third means in response to the binary one flux condition being produced at the output of the third means, and means for clearing the inputs and outputs of the first, second, and third magnetic core circuit means to a binary zero flux condition.

5. Apparatus as defined in claim 4 further including means for cyclically pulsing the clearing means associated with the first and third magnetic core circuit means, pulsing the means for transferring binary ones from the second means to the first means and from the third means to the first means, pulsing the clearing means associated with the second magnetic core circuit means, and pulsing the means for transferring binary ones from the first to the second magnetic core circuit means.

6. Apparatus as defined in claim 4 wherein the first magnetic core circuit means includes a single magnetic core element defining two principal closed flux loops with a pair of adjacent output apertures separating the two loops in one region of the core element, and an output winding linking the core means through said output apertures.

7. Apparatus as defined in claim 4 wherein the first magnetic core circuit means includes two separate negating core elements, an output winding linking each of the respective negating core elements, and a pair of input windings respectively linking the different ones of two negating core elements.

8. Apparatus as defined in claim 4 wherein the third magnetic core circuit means includes a single magnetic core element defining two principal closed flux loops with an output aperture separating the two loops at one point, and an output winding linking the core means through said output aperture.

9. Apparatus as defined in claim 4 wherein the third magnetic core circuit means includes a pair of straight transfer core elements each having an input winding and an output winding, the two output windings being connected in parallel.

10. A binary trigger circuit comprising an "exclusive or" circuit including magnetic core means of a material having high flux remanence, a pair of input windings linking a portion of said core means, an output winding linking portions of said core means, and a clearing winding linking portions of said core means for setting the flux to an initial condition, a delay circuit including magnetic core means of a material having a high flux remanence, an input winding linking a portion of the core means of the delay circuit, an output winding linking a portion of the core means of the delay circuit, and a clearing winding linking portions of the core means of the delay circuit for setting the flux to an initial condition, the output winding of the "exclusive or" circuit being directly connected in parallel with the input winding of the delay circuit to form a first coupling loop and the output winding of the delay circuit being connected to one of the input windings of the "exclusive or" circuit to form a second coupling loop, and means for sequentially pulsing a current through the clearing winding of the delay circuit, the first coupling loop, the clearing winding of the "exclusive or" circuit and the second coupling loop.

11. Apparatus as defined in claim 10 including means for regulating the current level of the pulses applied to the respective coupling loops to a predetermined level slightly below the threshold level required to switch flux in the core means of the delay circuit when it is in said initial flux condition.

12. Apparatus as defined in claim 11 further including means for selectively pulsing a current larger than the threshold level required to switch flux in the core means of the "exclusive or" circuit when it is in said initial flux condition, said last-named means being pulsed after the clearing winding of the "exclusive or" circuit has been pulsed and before the output winding is next pulsed by said separate pulsing means for changing the stable condition of the trigger circuit.

13. Apparatus as defined in claim 12 wherein the core means of the "exclusive or" circuit includes a single magnetic core element defining two principal closed flux loops with a pair of adjacent output apertures separating the two loops in one region of the core element, the output winding of the "exclusive or" circuit linking the core means through said output apertures.

14. Apparatus as defined in claim 12 wherein the core means of the "exclusive or" circuit includes two separate negating core elements, the output winding of the "exclusive or" circuit including turns linking each of the respective negating core elements, and the input windings of the "exclusive or" circuit respectively link the different ones of the two negating core elements.

15. Apparatus comprising one binary counter stage including an "exclusive or" magnetic core circuit including a pair of input windings and an output winding, a straight transfer magnetic core circuit having an input winding and a pair of output windings, the input winding being connected in shunt with the output winding of the "exclusive or" circuit to form a first transfer loop and one of the output windings being connected in shunt with one of the input windings of the "exclusive or" circuit to form a second transfer loop, an "and" magnetic core circuit having a pair of input windings and an output winding, one of the input windings being connected in shunt with the other of the output windings of the "and" circuit to form a third transfer loop, means for alternately pulsing a transfer current through the two windings of the first transfer loop and through the two windings of both the second and third transfer loops, and means for pulsing a current through the other input windings of the "exclusive or" circuit and the "and" circuit.

16. Apparatus as defined in claim 15 including a plurality of said binary counter stages, and transfer means coupling the output winding of the "and" circuit of each stage to said other input winding of the "exclusive or" circuit of the next succeeding stage.

17. Apparatus as defined in claim 16 wherein said transfer means comprises a straight transfer magnetic core circuit including an input winding and an output winding connected in shunt respectively with the output winding of the "and" circuit of the preceding stage and the input winding of the "exclusive or" circuit of the succeeding stage.

18. Apparatus as defined in claim 16 wherein the transfer means comprises a transfer loop including the output winding of the "and" circuit of the preceding stage and the input winding of the "exclusive or" circuit of the succeeding stage connected in shunt.

References Cited in the file of this patent

UNITED STATES PATENTS

| | | |
|---|---|---|
| 2,729,807 | Paivinen | Jan. 3, 1956 |
| 2,803,812 | Rajchman | Aug. 20, 1957 |
| 2,838,688 | Loewe | June 10, 1958 |
| 2,902,608 | Shelman | Sept. 1, 1959 |
| 2,925,500 | Meyerhoff | Feb. 16, 1960 |